United States Patent [19]

Lentini et al.

[11] Patent Number: 4,886,981

[45] Date of Patent: Dec. 12, 1989

[54] SYNCHRONIZING CIRCUIT FOR A PLURALITY OF POWER UNITS

[75] Inventors: Salvatore Lentini; Giuseppe Patti, both of Palermo, Italy

[73] Assignee: Italtel Societa Italiana, Milan, Italy

[21] Appl. No.: 10,137

[22] PCT Filed: Jun. 20, 1986

[86] PCT No.: PCT/EP76/00369

§ 371 Date: Feb. 3, 1987

§ 102(e) Date: Feb. 3, 1987

[87] PCT Pub. No.: WO87/00701

PCT Pub. Date: Jan. 29, 1987

[30] Foreign Application Priority Data

Jul. 16, 1985 [IT] Italy .................................. 21583 A/85

[51] Int. Cl.[4] .......................... H02J 1/00; G04C 11/00
[52] U.S. Cl. .......................................... 307/87; 363/72; 368/46
[58] Field of Search ..................... 307/87; 363/72, 65, 363/71, 78, 85; 328/133; 368/46, 48, 52, 58

[56] References Cited

U.S. PATENT DOCUMENTS

| | | | |
|---|---|---|---|
| 3,321,693 | 5/1967 | Heinrich et al. | 363/10 X |
| 3,381,205 | 4/1968 | Howell et al. | 363/72 |
| 3,710,133 | 1/1973 | Ferraro | 307/66 |
| 3,796,919 | 3/1974 | Johnson | 317/16 |
| 3,956,638 | 5/1976 | Ahrens et al. | 307/48 |
| 4,174,534 | 11/1979 | Kotlarewsky | 363/72 X |
| 4,318,007 | 3/1982 | Rizzi | 307/44 |
| 4,405,976 | 9/1983 | Mitchell et al. | 363/72 |
| 4,476,399 | 10/1984 | Yoshida et al. | 307/44 |
| 4,516,035 | 5/1985 | Rhoads et al. | 307/66 |
| 4,677,309 | 6/1987 | Ogawa | 307/46 |
| 4,694,193 | 9/1987 | Schlenk et al. | 307/62 |
| 4,707,142 | 11/1987 | Baker et al. | 307/87 X |

FOREIGN PATENT DOCUMENTS 0201681  11/1984  Japan .................................. 363/72

*Primary Examiner*—William M. Shoop, Jr.
*Assistant Examiner*—Sharon D. Logan
*Attorney, Agent, or Firm*—Birch, Stewart, Kolasch & Birch

[57] ABSTRACT

A power system includes as many synchronizing units as the number of the power units. Each synchronizing unit has been designed to receive an activation signal at its input and to be connected to the other units through of a first and a second discs. Each synchronizing unit delivers to its output a synchronizing clock signal for the respective power units. The first synchronizing unit which receives the activation signal is qualified as the master unit. This master unit applies a predetermined polarity to the first bus and a clock signal to the second bus in order to synchronize the other units in response to the detection of the polarity on the first bus, the other units are characterized as slave unit.

10 Claims, 3 Drawing Sheets

SYNCHRONIZING CIRCUIT FOR A PLURALITY OF POWER UNITS

BACKGROUND OF THE PRESENT INVENTION

The present invention relates to a circuit for synchronizing a plurality of power units with one another, and more, particularly to the type used in power stations for telecommunication systems.

Usually the latter are constituted by a plurality of power units (such as inverters, etc.) connected in parallel with one another. The parallel connection is used when the power station has to generate an amount of power that a single power unit alone could not supply and therefore, the required power is supplied by a plurality of power units connected in parallel one with another. Besides the number of units needed to provide the operating power, at least one additional unit is usually required in order to have a hot, active reserve in case one of the operative units fails. In almost all applications there is the problem that the units must be synchronized with one another and/or with the electrical power distribution line (i.e: the mains).

In particular, synchronizing operations are necessary when the units are DC-DC converters because, in case of a phase difference among the single units, low frequency interferences which lap oer the useful signal, may be registered.

On the other hand, when the power units are inverters, the synchronizing means are absolutely necessary, either to avoid damages described below, or to overcome the technical troubles which may arise from the switching power station-power distribution line.

It is useful to point out that the inverters are constituted by units adapted to receive a direct current on the input side and to deliver an output of alternating current having the same characteristics of the power distribution line.

The above mentioned switching must be carried out however with phase continuity, otherwise the single units will be pulled in to the mains at differentiated speeds and cause a phase irregularity from the single units which compose the power station.

The inverters of the latest generation are characterized by the fact that they have an output impedance that is sensibly low in order to approximate the characteristics of an ideal voltage generator. This characteristic implies a perfect synchronism among the inverters of a same station; because if one of the units is not in phase with the remaining units, the power delivered by the remaining units is transferred into the unit which is out of phase causing possible damage to it.

In accordance with well known solutions, the synchronization troubles mentioned above may be solved by sending to a common branch point the clock signals generated by the single inverters. A reference clock signal is thus created at the branch point that has a frequency equal to the arithmetical average of the inverters' frequencies. The devices are synchronized with the reference clock signal.

This system however presents the inconvenience that the pulling in field for the different oscillators must be limited in order to maintain the average frequency within acceptable values. Furthermore, the connection or disconnection of an inverter causes a transient frequency on the inverters actually operating.

Other solutions provide for a generation of a master clock signal through a central oscillator on which the single inverters are synchronized. This solution does not present the inconvenience of the connection transient described above, (because the inverter is connected once the synchronization has been adjusted), but on the other hand the following troubles may arise:

it maybe necessary to have a slave oscillator, operating in phase with the master oscillator in order to carry out the switching with phase continuity;

it introduces limits to the system's reliability due to the circuits which provide for the master-slave switching;

the cost of the structure described above (master oscillator, slave oscillator, switching circuits) constitutes a large part of the cost for a station when the station is only composed of two inverters.

The invention, as claimed, is intended to solve the problem of realizing a circuit without having the inconveniences mentioned above and at the same time it is suitable for switching a load to the electrical power distribution line without creating phase differences among the single inverters of the power station. For this purpose and according to the present invention, the circuit provides the connection of the respective synchronizing unit to each power unit. Each of the units has been designed to receive an activation signal at its input, to be connected to the other units by means of a first and a second bus, and to deliver to the output, the synchronizing clock signal for the relative power unit. The first synchronizing unit which receives the activation signal is characterized as the master unit. This master unit applies a predetermined polarity to the first bus and delivering a clock signal to the second bus in order to synchronize the other units which are characterized as slave units as a response to the detection of the polarity.

When the master unit receives a disconnection instruction at its input, it modifies the polarity on the first bus and qualifies the synchronizing unit, whose output clock signal has its phase shift anticipated in comparison to that of the other units The circuit as claimed in the present invention is characterized by the fact that each slave unit constitutes a standby unit readily available to replace the master unit which enable the following advantages:

possibility of large pulling-in fields;

high frequency stability for the master clock;

no centralized circuits on which the system's reliability depends;

no cost increase when the station is only constituted by two power units.

BRIEF DESCRIPTION OF THE DRAWINGS

Further characteristics of the invention will be made clear by the following description relating to an example of the present invention and by the attached figures where.

DETAILED DESCRIPTION OF THE DRAWINGS

Figure 1:
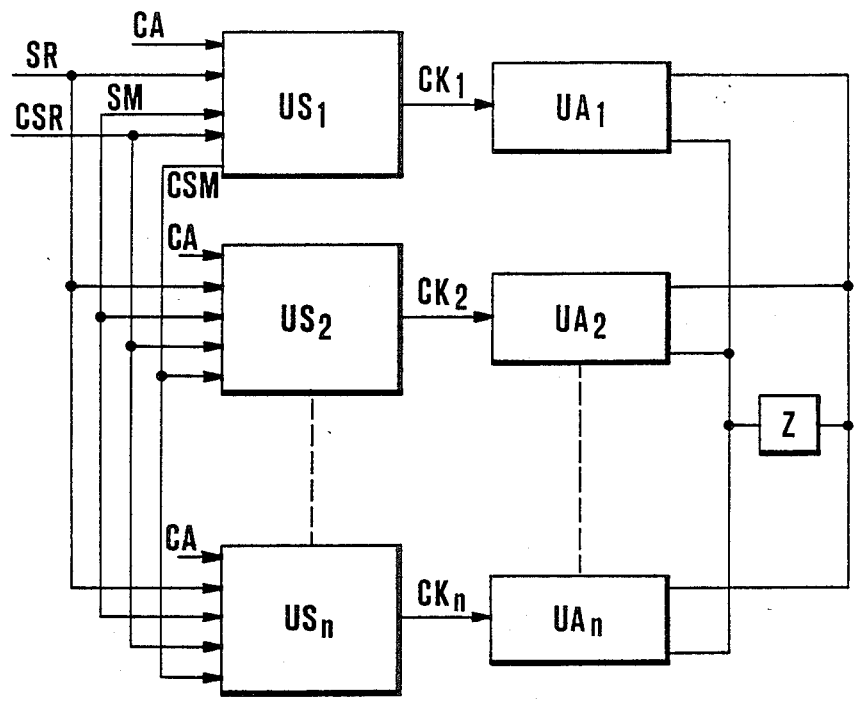
FIG. 1 shows the block diagram of a power station having the circuit as claimed by the invention.

In FIG. 1, the references $UA_1$, $UA_2$, ... $UA_n$ indicate power units which together with the circuit, according to the present invention, are part of a power station for a telecommunications systems feeding a load Z. The circuit provides the presence of n synchronizing units $US_1$, $US_2$, ..., $US_n$, each of which is designed to provide a synchronizing clock signal $CK_1$, $CK_2$, ..., $CK_n$ for the respective power unit.

Each synchronizing unit US has been designed to receive an activation signal CA at its input, as well as to be connected to the remaining units by means of a first and second bus CSM and SM. The first unit which receives the activation signal CA at its input acts as a master unit and is so qualified by applying a predetermined polarity to the first bus CSM and sending its own clock signal to the second bus SM.

The other units, when activated, detect the polarity on the first bus CSM and are characterized as slave units by synchronizing their own clock signals with the clock signal of the second bus SM.

In the event that the master unit fails or if it is intentionally disconnected, the polarity present on the first bus CSM, changes thus enabling one of the remaining units to be qualified as master.

The slave units detect the presence of the polarity variation. In particular said variation is detected by the US unit whose output clock has its phase shift anticipated in comparison to the clock signals of the remaining units. This unit is characterized therefore as the master unit, and resets the polarity on the first bus and delivers its own clock signal to the second bus, which is qualified as master synchronizing clock signal.

If two or more units detect the absence of the master unit at the same time and all of them are characterized as such, their respective oscillators will tend to drift towards their own nominal frequencies, and as a consequence, after just a few moments, the unit having the clock signal anticipated in comparison to that of the other units will be qualified as master unit.

The present invention, as claimed also provides the possibility of synchronizing the power station to the electrical power distribution line. For this purpose there is also a third and a fourth bus, referred to as mains synchronism control CSR and mains synchronism SR.

When synchronization to the mains is required, the CSR signal is activated. This situation is detected by the master module which synchronizes its own oscillator to the clock signal present on the fourth bus SR. The master unit then delivers a clock signal, synchronized to the SR clock signal, to the second bus SM thus determining, as a consequence, the synchronization as well of the slave units.

Figure 2:
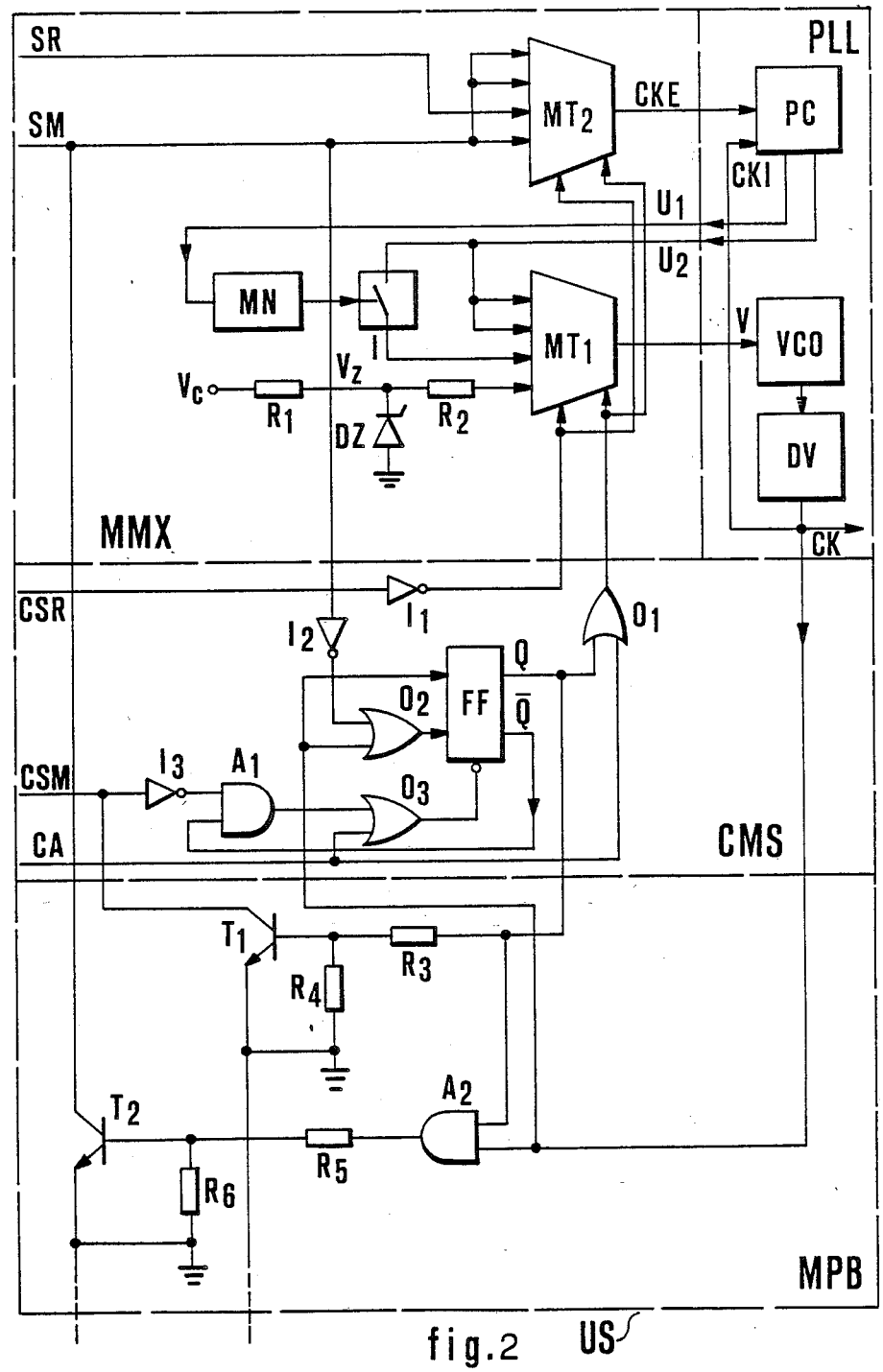
FIG. 2 shows in detail one of the present synchronizing units US of FIG. 1.

FIG. 2 illustrates in detail one of the synchronizing units US, shown in FIG. 1. Said unit includes a phase locking circuit PLL, multiplexing means MMX, master-slave characterizing means CMS and bus driving means MPB.

The phase locking circuit PLL provides a phase comparator PC and a voltage controlled oscillator VCO. A frequency divider DV is connected to the output of the voltage controlled oscillator.

Figure 3:
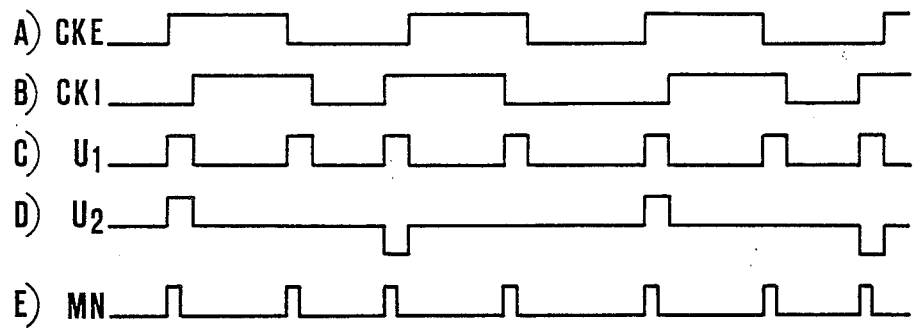
FIGS. 3 and 4 show wave forms relating to the synchronizing unit US illustrated in FIG. 2.

The PC unit receives the external clock signal CKE at its first input and the internal clock signal CKI at its second input, this latter signal is also available at the output of the frequency divider DV. In diagrams A and B of FIG. 3, a hypothetic phase relationship between the CKE sequence pulses and the CKI sequence pulses is illustrated, as well as, the signals delivered by the PLL unit in response to the reception of the sequences. The CKI pulses' length has been varied in order to better show the PLL unit operation.

In particular, the PC unit delivers to the first output $U_1$ (see diagram C) a pulse sequence having a duration that is proportional to the interval of time between the transition of the CKE signal and the transition of the CKI signal. Pulses having a duration proportional to the interval of time between a positive transition of the CKE signal and a positive transition of the CKI signal, and a positive sign or a negative sign if the CKE signal is anticipated or delayed in comparison to the CKE signal, are available at the output $U_2$ (see diagram D).

The VCO unit receives a signal V at its input which determines a modification for the frequency of the CKI signal aiming to cancel any deviations from the CKE signal's frequency.

The PLL circuit described above is characterized in that it has a very high loop gain with consequent low immunity to interferences. The present invention includes means adapted to limit the PLL's dynamic loop gain when the mains synchronism control CSR is active, thus increasing the circuit's immunity to any interference present on the mains synchronism SR. The interference could cause negative effects to the power unit UA in operation. The means described above are a part of the multiplexing means MMX and are adapted to chop the signal available at the PLL's output $U_2$ by using an electronic switch I, controlled by the pulses corresponding to the output of a monostable circuit MN adapted to receive the PLL's output $U_1$. The pulses corresponding to the output of the MN unit are illustrated in diagram E of FIG. 3.

The signal V reaches the VCO unit through a first multiplexer $MT_1$ which receives the pulses from the $U_2$ output of the PC unit at its first and second input. The pulses from the switch I output are received by the VCO at its third input and a monitoring voltage $V_c$, (through a first and second resistance $R_1$ and $R_2$ and stabilized by a Zener diode DZ) is received at its fourth input.

The external clock signal CKE reaches the PC unit through a second multiplexer $MT_2$, which receives the mains synchronism SR pulses at its third input, and the master synchronism SM pulses at its first, second and fourth inputs.

The multiplexers $MT_1$ and $MT_2$ receive signals coming from the master-slave qualifying means CMS at their control inputs. The activation control CA, a mains synchronism control CSR and a master synchronism control CSM are delivered to the input of the master-slave qualifying means CMS. The CSR control reaches the first control input of the $MT_1$ and $MT_2$ units through an inverter circuit $I_1$. The CA control reaches the second control input of the $MT_1$ and $MT_2$ units through a logical sum circuit $O_1$ which receives the output Q from a bistable circuit FF of the D type at its second input. The bistable circuit FF receives the internal clock CKI at its data input, and the same internal clock CKI at its timing input through a logical sum circuit $O_2$ which receives the SM pulses at its second input through an inverting circuit $I_2$. The FF unit has the enabling input connected to the output of another logical sum unit $O_3$ which receives the CA control at its first input and at its second input the output of a logical product circuit $A_1$, adapted to receive through an inverting circuit $II_3$ the CSM control signal, as well as, the output $\overline{Q}$ of FF.

The bus driving means MPB include a first and second transistor $T_1$ and $T_2$ having their emitters and collectors connected in series respectively to the first and second bus. The base of $T_1$ is connected to the output Q of FF by means of a resistance $R_3z$ and also to the emitter by means of a resistance $R_4$. The base of $T_2$, on the other hand, is connected to the output Q of FF by means of a logical product circuit $A_2$ and a resistance $R_5$. The $A_2$ unit receives the clock signal CKI at its second input. A resistance $R_6$ is connected between the base and the emitter of $T_2$.

Figure 4:
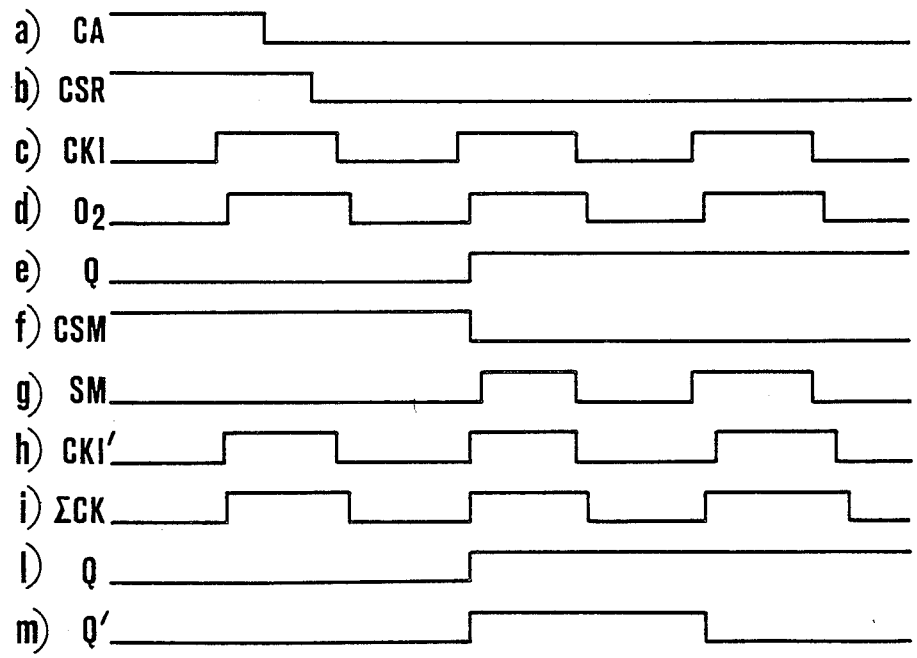

The operation of the structure as described above is described below using of the waveforms illustrated in FIG. 4, wherein diagram (a) shows the activation signal CA which when the unit is disconnected, presents a high logical value.

For description purposes only, assume that the unit in question is the first unit activated and that the mains synchronism signal CSR is active so as to synchronize the said unit to the electrical power distribution line. The signal CSR is illustrated in diagram (b) of FIG. 4.

Under these conditions, the mains synchronism pulses SR correspond to the output of $MT_2$, while the pulses available at the output of the switch I correspond to the output of $MT_1$. In relation to the phase difference between the internal clock CKI and the external clock CKE, these pulses determine the charge or discharge of a condenser (not illustrated) present in the VCO unit and correct the frequency of the CKI pulses until it coincides with that of the CKE=SR pulses.

When the activation control CA assumes logical value zero, the FF unit is enabled to transfer the logical levels present at its data input (see diagram c of FIG. 4) to output Q in correspondence with the positive transitions of the pulses available at the output of the $O_2$ (see diagram d).

As the pulses applied to the timing input of FF are delayed in comparison to the pulses applied to the data input (as the former pass through the $O_2$ unit) on the first positive transition of the pulses available at the output of the latter unit, the activation of the Q output of FF is registered (see diagram e) and consequently the transistor $T_1$ applies a zero polarity to the first bus CSM (see diagram f). The output Q of FF also determines the enabling of the $A_2$ unit which sends the CKI pulses, provided by the PLL unit, to the second bus SM (see diagram g).

The presence of the zero polarity on the first bus CSM is detected by the remaining units on the activation of the relative CA signal. The delivery of the SM signal present on the second bus and at the output of $MT_2$ and of the signal available at the $U_2$ output of PLL to the output of $MT_1$ occurs in the units. In this manner, the slave units are synchronized with the SM pulses provided by the master unit, and as the latter is synchronized with the SR pulses, a synchronization of all the units with the SR pulses is obtained.

If the mains synchronism signal CSR is switched off, the master unit delivers the voltage $V_z$ to the output of $MT_1$ and the clock signal, provided by the respective PLL unit, to the output of $MT_2$. The presence of the resistance $R_2$ and the internal capacitance of the VCO unit, assure that the PLL unit (associated to the master unit) gradually tends to oscillate at its nominal frequency thus avoiding the danger of sudden phase shifts.

When the master unit receives a switching off instruction (CA signal with logical value one) the FF is no longer enabled and generates a logical value zero which cuts off the transistor $T_1$. The slave units detect the presence of a logical "one" polarity on the CSM bus and the unit whose CKI clock has an anticipated phase is qualified as the master unit. If all the units have a phase coincidence, it may be that two or more units are characterized as master units and conseqently their respective PLL units tend to shift towards their nominal frequency. When the phase difference between these said units become an appreciable entity (see diagram h of FIG. 4 where the clock CKI' of a generical unit is shown) only the unit having its phase anticipated remains qualified as the master unit. When there is no master unit, a signal obtained from the sum of the clock signals of all the units is registered at the output of the $O_2$ unit (see diagram i). This signal, reaching the timing input of FF, enables the unit which has an anticipated phase to keep its output Q active (see diagram l), while the output Q' of the FF unit, whose clock CKI' has its phase delayed, is disconnected as illustrated in diagram m).

The circuit fully meets the requirements described at the beginning of this description since it is adapted to synchronize a plurality of power units each with the other and to the electrical power distribution line and it further avoids that many units remain qualified as master unit before that the phase difference among the single units assumes values that could cause the troubles mentioned before.

What is claimed is:

1. A circuit for synchronizing a plurality of power units used in telecommunications systems, comprising:
    synchronizing unit associated with each power unit, wherein each said synchronizing unit is designed to receive an activation signal on the input, to be connected to the remaining synchronizing units through a first and a second bus and to deliver a synchronizing clock signal to the respective power unit by the fact that the first synchronizing unit which receives said activation signal on its input is qualified as master unit and applies a predetermined polarity to the first bus and a clock signal to the second bus adapted to synchronize the remaining synchronizing units which, in response to the detection of said polarity on the first bus, are qualified as slave units, and by the fact that when the master synchronizing unit receives a switching off signal on the input, it modifies the polarity on the first bus thus enabling the unit whose output clock signal has the phase anticipated in comparison with the others, to be qualified as master unit.

2. The circuit as described in claim 1, wherein each of said synchronizing units is also connected to the remaining synchronizing units by means of a third and a fourth bus which respectively receive a main synchronism and a clock signal that is synchronized with the electrical power distribution line, further characterized by the fact that when the main synchronism signal is operating, the master unit synchronizes the clock available on its output with said main synchronism clock signal, as response to the detection of the main synchronism signal.

3. The circuit as described in claim 2 wherein each synchronizing unit includes:
    a phase locking circuit designed to receive a clock signal present on the second or on the fourth bus, on its first input, another clock signal on its second input and a monitoring signal of its respective oscillator on its third input, furthermore designed to deliver to a first output a sequence of pulses with a length proportional to the time interval between a transition of the signal applied to its first input and a transition of the signal applied to its second input, and to its second output pulses whose length is proportional to the time interval between two positive transitions of the signals applied to said first and second input and whose sign is positive or negative if the signal applied to its first input is anticipated or delayed in comparison to the signal applied to its second input;

multiplexing means having their input connected to said second and fourth bus as well as to said first and second output of the phase locking circuit and also having their outputs connected to said first and third input of the phase locking circuit;

master-slave characterizing means having their input connected to said first and third bus, designed to receive said activation signal on their input as well as to deliver to the output another monitoring signal for said multiplexing means;

bus driving means which receive on the input the clock signal available on the output of the phase locking circuit and designed to send said clock signals to the second bus, as well as to apply said polarity to the first bus, when an output of the master-slave characterizing means is operating.

4. The circuit as described in claim 3 wherein said multiplexing means includes:

a first multiplexer designed to receive the signal available on the second output of the phase locking circuit on its first and second input, the same signal chopped on its third input and a monitoring voltage, stabilized by a Zener diode through a first and second resistance on its fourth input;

a chopping switch whose input is connected to the second output of the phase locking circuit and whose output is connected to the third input of the first multiplexer;

a monostable circuit whose input is connected to the first output of the phase locking circuit, while the output reaches the control input of said chopping switch;

a second multiplexer having its first, second and fourth input connected to said second bus and its third input connected to said fourth bus.

5. The circuit as described in claim 3 wherein said master-slave characterizing means includes:

a D type bistable circuit designed to receive the pulses generated by the phase locking circuit at the data input;

a first logical sum circuit designed to receive the output of the bistable circuit on the first input and said activation signal on its second input;

a second logical sum circuit, having the output connected to the timing input of the bistable circuit, whose first input receives the clock signal generated by the phase locking circuit, while the second input is connected to the second bus;

a third logical sum circuit whose output is connected to the enabling input of the bistable circuit, whose first input receives said activation signal while the second input is connected to the output of a first logical product unit having its inputs connected to the inverted output of the bistable circuit and to said first bus.

6. The circuit as described in claim 3 wherein said bus driving means includes:

a first transistor having the emitter and the collector connected in series to the first bus and having the base connected to the output of the bistable circuit;

a second logical product circuit whose first input receives the clock signal generated by the phase locking circuit, while the second input is connected to the output of the bistable circuit;

a second transistor having the collector and the emitter connected in series to the second bus and having the base connected to the output of the second logical product circuit.

7. A power system for generating synchronized power comprising:

a plurality of power generating units, each power generating unit generating power at different frequencies;

synchronization means, operatively connected to each said power generating unit, for designating a certain power generating unit as a master unit and the remaining power generating units as slave units;

first bus means, operatively connected to said synchronization means, for providing to said slave units, through said synchronization means, a predetermined polarity signal from said master unit, said predetermined polarity signal communicating, through said synchronization means, to said slave units that said master unit is operating; and second bus means, operatively connected to said synchronization means, for providing to said slave units, through said synchronization means, a clock signal to be used for synchronization of said plurality of power generating units, said clock signal being generated, through said synchronization means by said master unit;

said slave units, in response to said predetermined polarity signal and said clock signal, generating power in synchronization with said power generated by said master unit;

said synchronization means, in response to no said predetermined polarity signal being present on said first bus means, comparing said clock signal with a clock signal produced through said synchronization means from a certain slave unit, said synchronization means designating said certain slave unit as a new master unit when said certain slave unit's clock signal, produced through said synchronization means anticipates said clock signal of said second bus means, thereby establishing said new master unit when the original master is no longer operating.

8. The power system as claimed in claim 7, wherein said synchronization means comprises a plurality of synchronization units, each synchronization unit being associated with an individual power generating unit.

9. The system as claimed in claim 8, wherein the system further comprises:

third bus means, operatively connected to said synchronization means and a power distribution line, for providing to said synchronization means a power distribution line synchronism signal, said power distribution line synchronism signal communicating to said master unit's synchronization means to synchronize with said power distribution line's frequency, thereby communicating to said master unit's synchronization means that said power distribution line is dominant over said master unit; and fourth bus means, operatively connected to said synchronization means and said power distribution line, for providing to said synchronization means a clock signal to be used for synchronization of the power system to the power distribution line.

10. The circuit as described in claim 1 wherein each synchronizing unit includes:
- a phase locking circuit designed to receive a clock signal present on the second or on a fourth bus, on its first input, another clock signal on its second input and a monitoring signal of its respective oscillator on its third input, furthermore designed to deliver to a first output a sequence of pulses with a length proportional to the time interval between a transition of the signal applied to its first input and a transition of the signal applied to its second input, and to its second output, pulses whose length are proportional to the time interval between two positive transitions of the signals applied to said first and second input and whose sign is positive or negative if the signal applied to its first input is anticipated or delayed in comparison to the signal applied to its second input;
- multiplexing means having their input connected to said second bus and a fourth bus as well as to said first and second output of the phase locking circuit and also having their outputs connected to said first and third input of the phase locking circuit;
- master-slave characterizing means having their input connected to said first bus and a third bus designed to receive said activation signal on their input as well as to deliver to the output, monitoring signals of said multiplexing means;
- bus driving means which receive on the input the clock signal available on the output of the phase locking circuit and designed to send said clock signals to the second bus, as well as to apply said polarity to the first bus, when an output of the master-slave characterizing means is operating.

* * * * *

UNITED STATES PATENT AND TRADEMARK OFFICE
CERTIFICATE OF CORRECTION

PATENT NO. : 4,886,981
DATED : December 12, 1989
INVENTOR(S) : Salvatore Lentini and Giuseppe Patti It is certified that error appears in the above-identified patent and that said Letters Patent is hereby corrected as shown below:

<u>Title page,</u>
Item [86], please change the PCT No.: from "PCT/EP76/00369" to -- PCT/EP86/00369 --.

Signed and Sealed this

Fifth Day of November, 2002

Attest:

Attesting Officer

JAMES E. ROGAN
*Director of the United States Patent and Trademark Office*